United States Patent
Resconi

(10) Patent No.: US 7,459,511 B2
(45) Date of Patent: Dec. 2, 2008

(54) PROCESS FOR THE POLYMERIZATION OF 1-BUTENE

(75) Inventor: Luigi Resconi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/480,762

(22) PCT Filed: Jun. 11, 2002

(86) PCT No.: PCT/EP02/06574

§ 371 (c)(1),
(2), (4) Date: Dec. 12, 2003

(87) PCT Pub. No.: WO02/100908

PCT Pub. Date: Dec. 19, 2002

(65) Prior Publication Data

US 2004/0254315 A1 Dec. 16, 2004

(30) Foreign Application Priority Data

Jun. 12, 2001 (EP) .................................. 01202264

(51) Int. Cl.
C08F 10/08 (2006.01)
C08F 4/76 (2006.01)
C08F 4/52 (2006.01)
C08F 4/64 (2006.01)
(52) U.S. Cl. .................... 526/161; 526/172; 526/348.6; 526/348.2; 526/348; 526/943; 526/160; 526/170
(58) Field of Classification Search ............. 526/348.6, 526/160, 161, 126, 943, 170, 172
See application file for complete search history.

(56) References Cited

U.S. PATENT DOCUMENTS

| | | | |
|---|---|---|---|
| 4,298,722 A | 11/1981 | Collette et al. ........... 526/348.6 |
| 4,971,936 A | 11/1990 | Wilson et al. |
| 5,132,381 A * | 7/1992 | Winter et al. ................ 526/160 |
| 5,145,819 A | 9/1992 | Winter et al. ................ 502/117 |
| 5,276,208 A | 1/1994 | Winter et al. |
| 5,455,366 A | 10/1995 | Rohrmann et al. |
| 5,532,396 A | 7/1996 | Winter et al. |
| 5,576,260 A | 11/1996 | Winter et al. |
| 5,612,428 A | 3/1997 | Winter et al. |
| 5,616,747 A | 4/1997 | Rohrmann et al. ............ 556/11 |
| 5,696,045 A | 12/1997 | Winter et al. |
| 5,698,487 A | 12/1997 | Sacchetti et al. |
| 5,700,886 A | 12/1997 | Winter et al. |
| 5,786,432 A | 7/1998 | Küber et al. ................ 526/127 |
| 5,830,821 A | 11/1998 | Rohrmann et al. .......... 502/117 |
| 5,859,159 A | 1/1999 | Rossi et al. |
| 5,965,756 A | 10/1999 | McAdon et al. |
| 6,034,022 A | 3/2000 | McAdon et al. |
| 6,084,115 A | 7/2000 | Chen et al. |
| 6,124,231 A | 9/2000 | Fritze et al. |
| 6,143,827 A | 11/2000 | Morizono et al. |
| 6,150,481 A | 11/2000 | Winter et al. |
| 6,156,844 A | 12/2000 | Hashimoto et al. |
| RE37,384 E | 9/2001 | Winter et al. |
| 6,329,479 B1 | 12/2001 | Arai et al. |
| 6,369,254 B1 | 4/2002 | Resconi et al. |
| 6,399,533 B2 | 6/2002 | Sacchetti et al. |
| 6,444,833 B1 * | 9/2002 | Ewen et al. ................... 556/11 |
| 6,448,350 B1 | 9/2002 | Dall'Occo et al. |
| 6,451,938 B1 * | 9/2002 | Fisher et al. ................. 526/161 |
| 6,469,114 B1 * | 10/2002 | Schottek et al. ............. 526/127 |
| 6,479,424 B1 | 11/2002 | Ernst et al. |
| 6,635,779 B1 | 10/2003 | Ewen et al. |
| 6,919,614 B2 | 7/2005 | Blisson et al. |
| 6,930,160 B2 | 8/2005 | Minami et al. |
| 6,953,829 B2 | 10/2005 | Kratzer et al. |
| 6,987,196 B2 | 1/2006 | Resconi et al. |
| 7,041,750 B1 | 5/2006 | Covezzi et al. |

(Continued)

FOREIGN PATENT DOCUMENTS

DE 199178985 10/2000

(Continued)

OTHER PUBLICATIONS

C. Carman et al., "Monomer Sequence Distribution in Ethylene-Propylene Rubber Measured by $^{13}C$ NMR 3. Use of Reaction Probability Model;" *Macromolecules*, 10, p. 536 (1977).

(Continued)

*Primary Examiner*—Vasu Jagannathan
*Assistant Examiner*—Rip A. Lee
(74) *Attorney, Agent, or Firm*—Jarrod N. Raphael

(57) ABSTRACT

A process for polymerizing 1-butene comprising the step of contacting under polymerization conditions 1-butene and optionally from 0 to 20% by mol of an alpha olefin with a catalyst system obtainable by contacting a bridget metallocene compound of formula (I) wherein R1 and R2 are an hydrocarbon radical A is a carbon atom, a germanium atom or a silicon atom; m is 1, 2; M is a metal of group 4 of the Periodic Table of the Elements; X, is hydrogen, a halogen atom, or a group R, OR, OSO2CF3, OCOR, SR, NR2 or PR2, wherein the substituents R are hydrocarbon radical; L is a moiety of formula (IIa) or (IIb) wherein T is an oxigen (O) or sulphur (S) atom or a CH2 group; and R3 and R4 are hydrogen atoms or hydrocarbon radicals; one or more alumoxanes or compounds able to form an alkylmetallocene cation; and optionally an organo aluminium compound.

5 Claims, No Drawings

U.S. PATENT DOCUMENTS

| | | |
|---|---|---|
| 7,074,864 B2 | 7/2006 | Resconi |
| 7,101,940 B2 | 9/2006 | Schottek et al. |
| 7,115,761 B2 | 10/2006 | Resconi et al. |
| 7,166,683 B2 | 1/2007 | Resconi |
| 7,241,903 B2 | 7/2007 | Fritze et al. |
| 2003/0149199 A1 | 8/2003 | Schottek et al. |
| 2004/0132612 A1 | 7/2004 | Resconi et al. |
| 2004/0242815 A1 | 12/2004 | Resconi et al. |
| 2005/0254315 A1 | 11/2005 | Salters |
| 2006/0052553 A1 | 3/2006 | Resconi et al. |
| 2006/0084769 A1 | 4/2006 | Resconi et al. |
| 2006/0155071 A1 | 7/2006 | Morini et al. |
| 2006/0167195 A1 | 7/2006 | Resconi et al. |
| 2007/0149729 A1 | 6/2007 | Resconi |

FOREIGN PATENT DOCUMENTS

| | | |
|---|---|---|
| DE | 199962814 | 6/2001 |
| DE | 19962910 | 7/2001 |
| EP | 172961 | 3/1986 |
| EP | 0172961 | 3/1986 |
| EP | 186287 | 7/1986 |
| EP | 352362 | 1/1990 |
| EP | 353318 | 7/1990 |
| EP | 0485823 | 5/1992 |
| EP | 549900 | 7/1993 |
| EP | 633272 | 1/1995 |
| EP | 775707 | 5/1997 |
| EP | 0982328 | 3/2000 |
| GB | 1460795 | 1/1977 |
| JP | 60262804 | 12/1985 |
| JP | 62119213 | 5/1987 |
| JP | 3126704 | 5/1991 |
| WO | 9102012 | 2/1991 |
| WO | 9200333 | 1/1992 |
| WO | 9205208 | 4/1992 |
| WO | 95/32995 | 12/1995 |
| WO | 9822486 | 5/1998 |
| WO | WO98/22486 A1 * | 5/1998 |
| WO | WO99/40129 A1 * | 2/1999 |
| WO | 9921899 | 5/1999 |
| WO | 9940129 | 8/1999 |
| WO | 9945043 | 9/1999 |
| WO | WO99/46270 | 9/1999 |
| WO | 0121674 | 3/2001 |
| WO | 0144318 | 6/2001 |
| WO | WO01/44319 | 6/2001 |
| WO | WO02/16450 | 2/2002 |
| WO | 0162764 | 8/2002 |
| WO | WO02/100908 | 12/2002 |
| WO | WO02/100909 | 12/2002 |
| WO | WO03/042258 | 5/2003 |
| WO | 2004/033510 | 4/2004 |
| WO | WO2004/050713 | 6/2004 |
| WO | WO2004/050724 | 6/2004 |

OTHER PUBLICATIONS

W. Kaminsky et al., "Homopolymerizations of α-Olefins with Diastereomeric Metallocene/MAO Catalysts;" *Macromolecules*, 33, pp. 1955-1959 (2000).

N. Naga et al., "Polymerization Behavior of α-olefins with rac-and meso-type ansa-metallocene catalysts: Effects of Cocatalyst and metallocene Ligand;" *Macromolecular Chemistry and Physics*, vol. 200(7), p. 1587-1594 (1999).

A. Rossi et al., "End Groups in 1-butene Polymerization via Methylaluminoxane and Zirconocene Catalyst," *Macromolecules*, American Chemical Society, vol. 28(6), p. 1739-1749 (1995).

N. Naga et al., "Effect of Co-Catalyst System on Alpha-Olefin Polymerization with Rac- and Meso- Udimethylsilylenebis(2,3,5-Trimethylcyclopentadienyl)Zirconium Dichloride;" *Macromolecular: Rapid Communications*, vol. 18(7), p. 581-589 (1997).

V. Busico et al., "Regiospecificity of 1-butene polymerization catalyzed by C2-symmetric group IV metallocenes;" *Macromol. Rapid Commun.*, vol. 16, p. 269-274 (1995).

J. A. Ewen, "Polymerization Catalysts with Cyclopentadienyl Ligands Ring-Fused to Pyrrole and Thiophene Heterocycles," Jnl of Am Chem Soc, vol. 120, No. 41, p. 10786-10787 (1998).

J. Suhm et al., "Influence of Metallocene Structures on ethene copolymerization with 1-butene and 1-octene;" *Journal of Molecular Catalysis*, vol. 128, p. 215-227 (1998).

U.S. Appl. No. 11/376,409, Resconi, filed Mar. 15, 2006.

J. Suhm et al., "Influence of metallocene structures on ethene copolymerization with 1-butene and 1-octene," *Journal of Molecular Catalysis A; Chemical* 128 p. 215-227.

Office Action from currently pending U.S. Appl. No. 10/536,857 with mail date Mar. 1, 2006.

Response to Restriction Requirement from currently pending U.S. Appl. No. 10/536,857 with mail date Mar. 23, 2006.

Office Action from currently pending U.S. Appl. No. 10/536,857 with mail date May 9, 2006.

Amendment from currently pending U.S. Appl. No. 10/534,857 with mail date Sep. 1, 2006.

Office Action from currently pending U.S. Appl. No. 10/536,857 with mail date Nov. 15, 2006.

Amendment from currently pending U.S. Appl. No. 10/536,857 with mail date Apr. 13, 2007.

Notice of Allowability from currently pending U.S. Appl. No. 10/536,857 with mail date May 3, 2007.

Notice of Allowance & Fee(s) Due from currently pending U.S. Appl. No. 10/536,857 with mail date Jun. 4, 2007.

Office Action from currently pending U.S. Appl. No. 10/536,858 with mail date May 22, 2006.

Amendment from currently pending U.S. Appl. No. 10/536,858 with mail date Sep. 22, 2006.

Notice of Allowability from currently pending U.S. Appl. No. 10/536,858 with mail date Dec. 1, 2006.

Notice of Allowance & Fee(s) Due from currently pending U.S. Appl. No. 10/536,858 with mail date Dec. 11, 2006.

Supplemental Notice of Allowability from currently pending U.S. Appl. No. 10/536,858 with mail date Feb. 27, 2007.

Notice of Allowability from currently pending U.S. Appl. No. 10/536,858 with mail date Jun. 15, 2007.

Notice of Allowance & Fee(s) Due from surrently pending U.S. Appl. No. 10/536,858 with mail date Jun. 29, 2007.

R. Halterman et al., "Synthesis and structure of [1,2-bis(1-indenyl)benzene]titanium and zirconium dichlorides," *Journal of Organometallic Chemistry*, vool. 568, p. 41-51 (1998).

Office Action from currently pending U.S. Appl. No. 10/536,857 with mail date Oct. 4, 2007.

Office Action from currently pending U.S. Appl. No. 10/536,858 with mail date Dec. 13, 2007.

* cited by examiner

PROCESS FOR THE POLYMERIZATION OF 1-BUTENE

This application is the U.S. national phase of International Application PCT/EP02/06574, filed Jun. 11, 2002.

An object of the present invention is a process for polymerizing 1-butene comprising the step of contacting under polymerization conditions 1-butene and optionally from 0 to 20% by mol, preferably from 0 to 10% by mol of ethylene, propylene and/or an alpha olefin of formula $CH_2=CHZ$ wherein Z is a $C_3-C_{10}$ alkyl group, in the presence of a catalyst system obtainable by contacting:

a) a racemic or racemic-like bridged metallocene compound of formula (I)

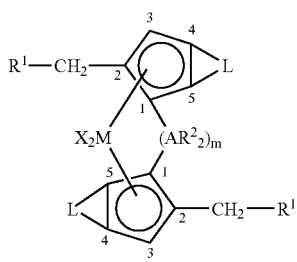

(I)

wherein $R^1$, same or different, are selected from the group consisting of hydrogen, a linear or branched saturated or unsaturated $C_1-C_{20}$-alkyl, $C_3-C_{20}$-cycloalkyl, $C_6-C_{20}$-aryl, $C_7-C_{20}$-alkylaryl, $C_7-C_{20}$-arylalkyl radical, optionally containing heteroatoms belonging to groups 13-17 of the Periodic Table of the Elements; preferably $R^1$ is hydrogen or a $C_1-C_{20}$-alkyl radical, more preferably $R^1$ is hydrogen, methyl or ethyl;

A, same or different, is a carbon atom, a germanium atom or a silicon atom; with the proviso that, when m is 1, A is different from a carbon atom; preferably A is a silicon atom;

m is 1 or 2, preferably m is 1;

$R^2$, same or different, is hydrogen, a linear or branched saturated or unsaturated $C_1-C_{20}$-alkyl, $C_3-C_{20}$-cycloalkyl, $C_6-C_{20}$-aryl, $C_7-C_{20}$-alkylaryl, $C_7-C_{20}$-arylalkyl radical, optionally containing heteroatoms belonging to groups 13-17 of the Periodic Table of the Elements; preferably $R^2$ is hydrogen a $C_1-C_{20}$-alkyl or a $C_6-C_{20}$-aryl; more preferably $R^2$ is hydrogen, methyl or phenyl;

M is a transition metal atom selected from those belonging to group 4 of the Periodic Table of the Elements (new IUPAC version); preferably M is zirconium or hafnium, more preferably M is zirconium; X, same or different, is a hydrogen atom, a halogen atom, or a R, OR, $OSO_2CF_3$, OCOR, SR, $NR_2$ or $PR_2$ group, wherein R is a linear or branched, saturated or unsaturated $C_1-C_{20}$ alkyl, $C_3-C_{20}$ cycloalkyl, $C_6-C_{20}$ aryl, $C_7-C_{20}$ alkylaryl or $C_7-C_{20}$ arylalkyl radical, optionally containing heteroatoms belonging to groups 13-17 of the Periodic Table of the Elements; or two X can optionally form a substituted or unsubstituted butadienyl radical or a $OR^{11}O$ group wherein $R^{11}$ is a divalent radical selected from $C_1-C_{20}$ alkylidene, $C_6-C_{40}$ arylidene, $C_7-C_{40}$ alkylarylidene and $C_7-C_{40}$ arylalkylidene radicals; preferably X is a hydrogen atom, a halogen atom or a R group; more preferably X is chlorine or a methyl radical;

L, same or different, is a moiety of formula (IIa) or (IIb):

wherein in the moiety of formula (IIa) T bonds to the cyclopentadienyl group in position 5;

T is an oxygen (O) atom, a sulphur (S) atom or a $CH_2$ group; preferably T is sulphur;

$R^3$ and $R^4$, same or different, are hydrogen, linear or branched, saturated or unsaturated $C_1-C_{20}$-alkyl, $C_3-C_{20}$-cycloalkyl, $C_6-C_{20}$-aryl, $C_7-C_{20}$-alkylaryl, $C_7-C_{20}$-arylalkyl radicals, optionally containing heteroatoms belonging to groups 13-17 of the Periodic Table of the Elements, or in the moiety (IIb) $R^3$ and $R^4$ form together a saturated or unsaturated, condensed 5 or 6 membered ring optionally containing heteroatoms belonging to groups 13-16 of the Periodic Table of the Elements; preferably, in the moiety of formula (IIa) $R^3$ is hydrogen or methyl;

preferably in the moiety of formula (IIb) $R^3$ and $R^4$ are hydrogen or methyl;

b) an alumoxane or a compound able to form an alkylmetallocene cation; and c) optionally an organo aluminum compound.

Preferred structures for the $(R^2{}_2A)_m$ bridging group are $Si(CH_3)_2$, $SiPh_2$, $CH_2CH_2$, the $Si(CH_3)_2$ being the most preferred.

Non limitative examples of compound of formula (I) are:

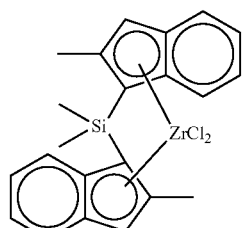 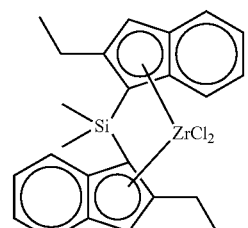

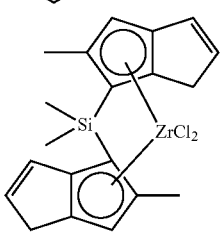 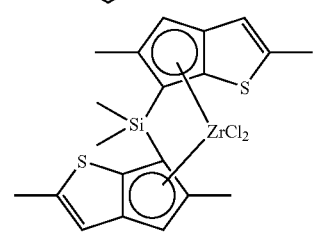

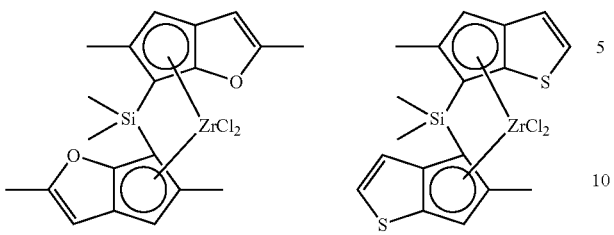

as well as the corresponding dihydride and dimethyl compounds.

Preferred compounds of formula (I) are those of formulas (III) or (IV):

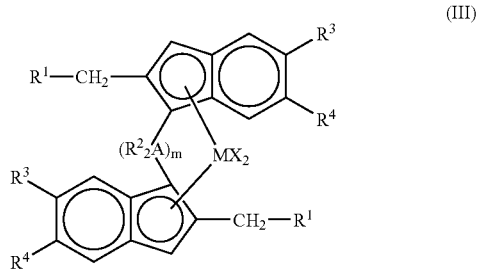

(III)

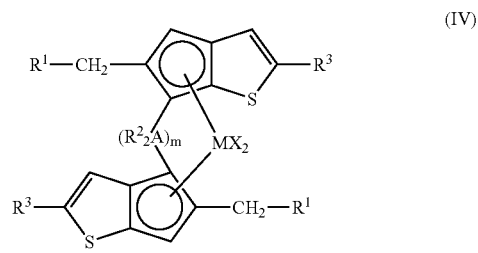

(IV)

wherein $R^1$, $R^2$, $R^3$, $R^4$, A, M, X and m are defined as above.

Metallocene compounds of formula (I) are well known in the art, they can be prepared according to known procedure, such as those described in U.S. Pat. No. 5,145,819, EP-A-0 485 823, WO 98/22486 and WO 01/44318.

Alumoxanes used as component b) can be obtained by reacting water with an organo-aluminium compound of formula $H_jAlR^6{}_{3-j}$ or $H_jAl_2R^6{}_{6-j}$, where $R^6$ substituents, same or different, are hydrogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl, optionally containing silicon or germanium atoms with the proviso that at least one $R^6$ is different from halogen, and j ranges from 0 to 1, being also a non-integer number. In this reaction the molar ratio of Al/water is preferably comprised between 1:1 and 100:1. The molar ratio between aluminium and the metal of the metallocene is comprised between about 10:1 and about 20000:1, and more preferably between about 100:1 and about 5000:1.

The alumoxanes used in the catalyst according to the invention are considered to be linear, branched or cyclic compounds containing at least one group of the type:

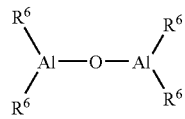

wherein the substituents $R^6$, same or different, are described above.

In particular, alumoxanes of the formula:

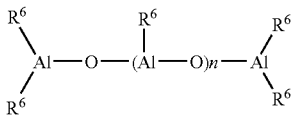

can be used in the case of linear compounds, wherein n is 0 or an integer from 1 to 40 and the substituents $R^6$ are defined as above, or alumoxanes of the formula:

can be used in the case of cyclic compounds, wherein u is an integer from 2 to 40 and the $R^6$ substituents are defined as above. Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Particularly interesting cocatalysts are those described in WO 99/21899 and in PCT/EP00/09111 in which the alkyl and aryl groups have specific branched patterns. Non-limiting examples of aluminium compounds according to said international applications are:

tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)

aluminium, tris(3-methyl-2-phenyl-butyl)aluminium, tris (2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation are compounds of formula $BAR_3P$ wherein P is a substituted or unsubstituted pyrrol radicals. These compounds are described in WO 01/62764. all these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammomiumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylaniliniumtetra(phenyl)borate,
N,N-Diethylaniliniumtetra(phenyl)borate,
N,N-Dimethylaniliniumtetrakis(pentafluorophenyl)boratee,
N,N-Dimethylaniliumtetrakis(pentafluorophenyl)aluminate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate,
N,N-Dimethylaniliniumtetrakis(pentafluorophenyl)borate.

Further compounds that can be used are those of formula RM'-O-M'R, R being an alkyl or aryl group, and M' is selected from an element of the Group 13 of the Periodic Table of the Elements (new IUPAC version). Compounds of this type are described, for example, in the International patent application WO 99/40129. Organic aluminum compounds used as compound c) are those of formula $H_jAlR^6_{3-j}$ or $H_jAl_2R^6_{6-j}$ described above. The polymerization process of the present invention can be carried out in liquid phase, optionally in the presence of an inert hydrocarbon solvent, or in gas phase. Said hydrocarbon solvent can be either aromatic (such as toluene) or aliphatic (such as propane, hexane, heptane, isobutane, cyclohexane and 2,2,4-trimethylpentane). Preferably the polymerization is carried out in liquid monomer. The polymerization temperature preferably ranges from 0° C. to 250° C.; preferably comprised between 20° C. and 150° C. and, more particularly between 40° C. and 90° C.; Generally, the polymers of the present invention are endowed with a narrow molecular weight distribution. The molecular weight distribution is represented by the ratio $M_w/M_n$ which, for the polymers of the present invention, when the metallocene used is a pure isomer, is generally lower than 3, preferably lower than 2.5. The molecular weight distribution can be varied by using mixtures of different metallocene compounds or mixtures of the metallocene compound of formula (I) and a Ziegler-Natta catalyst or by carrying out the polymerization in several stages at different polymerization on temperatures and/or different concentrations of the molecular weight regulators and/or different monomer concentration The polymerization yield depends on the purity of the transition metal organometallic catalyst compound a) in the catalyst, therefore, said compound can be used as such or can be subjected to purification treatments before use. With the process of the present invention 1-butene can be polymerized with high yields and the isotactic polymers obtained show a high molecular weight and a low content of regioerrors, i.e. 4,1 insertions. Therefore another object of the preset invention is a 1-butene homopolymer having the following characteristics:

intrinsic viscosity (I.V.)>1 dL/g; preferably>1.1 dL/g
molecular weight distribution (Mw)<3; preferably <2.5;
isotactic triads (mm)>syndiotactic triads (rr); preferably isotactic triads (mm)>97%; more preferably >98%; and
4,1 insertions <0.35%; preferably <0.3%; more preferably <0.25%.

Preferably the 1-butene homopolymer shows the presence of 4,1 insertions i.e. 4,1 insertions are >0; more preferably the 4,1 insertions are >0.05%; even more preferably >0.1%. With the process of the present invention it is possible to obtain a plastomeric 1-butene homopolymer. Thus further object of the present invention is a 1-butene homopolymer having the following characteristics:

intrinsic viscosity (I.V.)>1 dL/g; preferably >1.1 dL/g;
flexural modulus (ASTM D 638)<200 MPa; preferably <190 MPa;
4,1 insertions <0.35%; preferably <0.30%; more preferably <0.25%.

Preferably the 1-butene homopolymer shows the presence of 4,1 insertions i.e. 4,1 insertions are >0; more preferably the 4,1 insertions are >0.01%.

Said plastomeric 1-butene homopolymer is further endowed with a yield strength (ASTM D 638) >8 MPa; preferably comprised between 8 MPa and 15 MPa.

Said plastomeric 1-butene homopolymer is further endowed with a break strength (ASTM D 638) >20 MPa; preferably comprised between 20 MPa and 35 MPa.

Said plastomeric 1-butene homopolymer is further endowed with elongation at break (ASTM D 638) >390%; preferably >400%.

When 1-butene is copolymerized with ethylene, propylene or an alpha olefin of formula $CH_2=CHZ$ wherein Z is a $C_3$-$C_{10}$ alkyl group a copolymer having a comonomer derived unit content from 0.01 to 50% by weight can be obtained. preferably from 0.5 to 20% by weight. Preferred comonomers are ethylene or propylene.

The following examples are given to illustrate and not to limit the invention.

Experimental Section

The intrinsic viscosity (I.V.) was measured in tetrahydronaphtalene (a) at 135°.

The melting points of the polymers ($T_m$) were measured by Differential Scanning Calorimetry (D.S.C.) on a Perkin Elmer DSC-7 instrument, according to the standard method. A weighted sample (5-10 mg) obtained from the polymerization was sealed into aluminum pans and heated at 180° C. with a scanning speed corresponding to 10° C./minute. The sample was kept at 180° C. for 5 minutes to allow a complete melting of all the crystallites. Successively, after cooling to 20° C. with a scanning speed corresponding to 10° C./minute. After standing 2 minutes at 20° C., the sample was heated for the second time at 180° C. with a scanning speed corresponding to 10° C./min. In this second heating run, the peak temperature was taken as the melting temperature ($T_m$) and the area as global melting enthalpy ($\Delta H_f$).

The molecular weight distribution was determined on a WATERS 150 C using the following chromatographic conditions:

| | |
|---|---|
| Columns: | 3x SHODEX AT 806 MS; 1x SHODEX UT 807; 1x SHODEX AT-G; |
| Solvent: | 1,2,4 trichlorobenzene (+0.025% 2,6-Di-tert.Butyl-4-Methyl-Phenol); |
| Flow rate: | 0.6-1 ml/min; |
| Temperature: | 135° C.; |
| Detector: | INFRARED AT $\lambda \cong 3.5$ μm; |
| Calibration: | Universal Calibration with PS-Standards. |

$^{13}$C-NMR spectra were acquired on a DPX-400 spectrometer operating at 100.61 MHz in the Fourier transform mode at 120° C. The peak of the $2B_2$ carbon (nomenclature according to Carman, C. J.; Harrington, R. A.; Wilkes, C. E. *Macromolecules* 1977, 10, 535) was used as internal reference at 27.73. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove 1H-13C coupling. About 3000 transients were stored in 32K data points using a spectral window of 6000 Hz. Assignments of 4,1 insertion were made according to Busico (V. Busico, R. Cipullo, A. Borriello, *Macromol. Rapid. Commun.* 1995, 16, 269-274)

| Chemical Shift (ppm) | Carbon | Sequence |
|---|---|---|
| 40.21 | $CH_2$ ($S_{\alpha\alpha}$) | B |
| 39.65 | $CH_2$ | D1 |
| 37.3 | CH | D2 |
| 34.99 | CH | B |
| 34.31 | $CH_2$ | D3 |

-continued

| Chemical Shift (ppm) | Carbon | Sequence |
|---|---|---|
| 31.13 | $CH_2$ | D5 |
| 27.73 | $CH_2$ branch | B mmmm |
| 27.57 | $CH_2$ branch | B mmmr |
| 27.37 | $CH_2$ branch | B mmrr |
| 27.21-27.14 | $CH_2$ | D4 + D6 |
| 26.57 | $CH_2$ branch | B mrrm |
| 10.96 | $CH_3$ | B |

The content of 4,1 insertions was calculated as follows: 4,1 units=$0.5 \times I_4 \times 100/(I_2+I_4)$

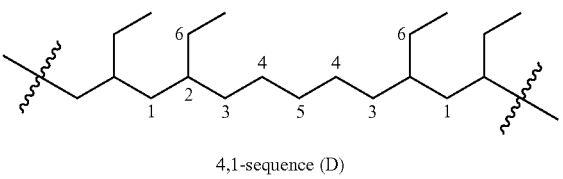

4,1-sequence (D)

Preparation of Catalyst Components rac dimethylsilylbis(2-methyl-indenyl)zirconium dichloride (A-1) was prepared according to U.S. Pat. No. 5,145,819. rac dimethylsilylbis(2-methyl-4-phenyl-indenyl)zirconium dichloride (A-2) was prepared according to U.S. Pat. No. 5,786,432. rac dimethylsilylbis(2-methyl-4, 5 benzo-indenyl)zirconium dichloride (A-3) was prepared according to U.S. Pat. No. 5,830,821. rac dimethylsilylbis(indenyl)zirconium dichloride (A-4) was prepared according to U.S. Pat. No. 5,616,747. Dimethylsilylbis bis(2-methyl-cyclopento[2,3-b]thiophen-6-yl)zirconium dichloride [A5]

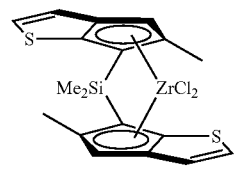

was prepared according to WO 98/22486.

The cocatalyst methylalumoxane (MAO) was a commercial product which was used as received (Witco AG, 10% wt/vol toluene solution, 1.7 M in Al).

EXAMPLE 1 AND COMPARATIVE EXAMPLES 2-3

1-butene homopolymer

The catalyst mixture was prepared by dissolving the amount of the metallocene indicated in table 1 in 8 ml of toluene with the proper amount of the MAO solution (amounts are reported in table 1), obtaining a solution which was stirred for 10 min at room temperature before being injected into the autoclave. 4 mmol of Al(i-Bu)$_3$ (TIBA) (as a 1 M solution in hexane) and 712 g of 1-butene were charged, at room temperature, in a 2.3-L jacketed stainless-steel autoclave, equipped with magnetically driven stirrer and a 35-mL stainless-steel vial, connected to a thermostat for temperature control. The autoclave was then thermostatted at 58° C. and the catalyst system, prepared as reported above, was injected in the autoclave by means of nitrogen pressure through the stainless-steel vial. The temperature was rapidly raised to 60° C. and the polymerization was carried out at constant temperature, for the time indicated in table 1. After cooling the reactor to room temperature, the polymer was dried under reduced pressure, at 60° C. The polymerization conditions and the characterization data of the obtained polymers are reported in Table 1.

COMPARATIVE EXAMPLE 4

1-butene homopolymer

The catalyst system was prepared by dissolving 2.2 mg of metallocene A-4 in 22 ml of toluene and then adding 9.42 mmol of MAO (Al/Zr=1930). The obtained solution was stirred for 10 minutes at room temperature, before being injected into the autoclave. 4 mmol of Al(i-Bu)$_3$ (TIBA) (as a 1 M solution in hexane) and 560 g of 1-butene were charged, at room temperature, in a 2.3-L jacketed stainless-steel autoclave, equipped with magnetically driven stirrer and a 35-mL stainless-steel vial, connected to a thermostat for temperature control. The autoclave was then thermostatted at 48° C. and the catalyst system, prepared as reported above, was injected in the autoclave by means of nitrogen pressure through the stainless-steel vial. The temperature was rapidly raised to 50° C. and the polymerization was carried out at constant temperature, for 60 minutes. After cooling the reactor to room temperature, the polymer was dried under reduced pressure, at 60° C. The polymerization conditions and the characterization data of the obtained polymers are reported in Table 1.

EXAMPLES 5-9

1-butene homopolymer

The catalyst mixture was prepared by dissolving the amount of the metallocene indicated in table 2 in toluene with the proper amount of the MAO solution (amounts are reported in table 2 Al/Zr=1000), obtaining a solution which was stirred for 10 min at room temperature before being injected into the autoclave.

A 4.25 litres steel autoclave, equipped with magnetically stirred anchor (usual stirring rate 550 rpm) and with different Flow Record & Control systems (FRC), among which a FRC having maximum flow rate of 9000 gr/hour for 1-butene and two FRC having maximum flow rate of 500 and 30 g/h for ethylene is cleaned with warm nitrogen (1.5 barg N2, 70° C., 1 hour). After the above mentioned autoclave cleaning, the stirring starts and 1-butene is fed into the reactor (1350 gr at 30° C.) together with 6 mmol of Al(i-Bu)$_3$ (TIBA) (as a 1 M solution in hexane). Subsequently, the reactor inner temperature is raised from 30° C. to the polymerisation temperature (indicated in table 2); as a consequence the pressure increases. When pressure and temperature are constant, the catalytic solution is fed into the reactor with a nitrogen overpressure. The polymerisation is run for a time indicated in table 2 at the chosen polymerization temperature. Then the stirring is interrupted; the pressure into the autoclave is raised to 20 bar-g with nitrogen. The bottom discharge valve is opened and the 1-butene/poly-1-butene mixture is discharged into the steel heated tank containing water at 70° C. The tank heating is switched off and a flux of 0.5 bar-g nitrogen is fed. After 1 hour cooling at room temperature the steel tank is opened and the wet polymer collected. The wet polymer is dried in a oven under nitrogen at 70° C. The polymerization conditions and the characterization data of the obtained polymers are reported in Table 2. The polymer obtained in example 8 was further analyzed by NMR according to the procedure described above. The sample shows the presence of 4,1 insertions.

Characterization of Homopolymer

Samples of polymer obtained from examples 8 and 9 were ground in an electric mill with liquid nitrogen in order to achieve the right size to feed them in a Brabender® mixer chamber. The ground samples were mixed in a Brabender® chamber with 1% 2,6- di-t-butyl-4-methyl phenol (BHT) at 200° C. and then transformed in 1.9 and 4.0 mm thick plaques through compression molding at 200° C. The 1.9 mm thick plaques were submitted to tensile test (according to ASTM D 638 method), while the 4.0 mm thick plaques were submitted to the flexural modulus determination according to ISO 178 method. The results are reported in table 2a.

EXAMPLES 10-13

1-butene/ethylene copolymer

The catalyst mixture was prepared by dissolving the amount of the metallocene indicated in table 2 in toluene with the proper amount of the MAO solution (amounts are reported in table 3 Al/Zr=500 excepting for example 10 when Al/Zr is 1000), obtaining a solution which was stirred for 10 min at room temperature before being injected into the autoclave. A 4.25 litres steel autoclave, equipped with magnetically stirred anchor (usual stirring rate 550 rpm) and with different Flow Record & Control systems (FRC), among which a FRC having maximum flow rate of 9000 gr/hour for 1-butene and two FRC having maximum flow rate of 500 and 30 g/h for ethylene is cleaned with warm nitrogen (1.5 barg N$_2$, 70° C., 1 hour). After the above mentioned autoclave cleaning, the stirring starts, 1-butene is fed into the reactor (1350 gr at 30° C. excepting for example 10 wherein 1368 g of 1-butene are used) with the amount of ethylene reported in table 3, together with 6 mmol of Al(i-Bu)$_3$ (TIBA) (as a 1 M solution in hexane). Subsequently, the reactor inner temperature is raised from 30° C. to the polymerisation temperature (indicated in table 3); as a consequence the pressure increases. When pressure and temperature are constant, the catalytic solution is fed into the reactor with a nitrogen overpressure and the polymerisation pressure is kept constant feeding only ethylene (amount indicated in table 3). The polymerisation is run for a time indicated in table 3 at the chosen polymerization temperature. Then the stirring is interrupted; the pressure into the autoclave is raised to 20 bar-g with nitrogen. The bottom discharge valve is opened and the 1-butene/poly-1-butene mixture is discharged into the steel heated tank containing water at 70° C. The tank heating is switched off and a flux of 0.5 bar-g nitrogen is fed. After 1 hour cooling at room temperature the steel tank is opened and the wet polymer collected. The wet polymer is dried in a oven under nitrogen at 70° C. The polymerization conditions and the characterization data of the obtained polymers are reported in Table 3

TABLE 1

| Ex | met. | mg | mmol Al | Al/Zr | t(min) | yield (g) | Activity kg/($g_{cat}$ * h) | I.V. | Triads mm % | regioerrors % (4,1 insertions) | $T_m$(II) °C. | $\Delta H_f$ J/g | Mw/Mn |
|---|---|---|---|---|---|---|---|---|---|---|---|---|---|
| 1 | A-1 | 4 | 8.39 | 1000 | 15 | 64.7 | 129.4 | 1.2 | 98.5 | 0.2 | 100 | 32.1 | 2.16 |
| 2* | A-2 | 4 | 6.36 | 1000 | 60 | 39.5 | 9.9 | 0.9 | ≈100 | 0.4 | n.a. | 33 | n.a. |
| 3* | A-3 | 4 | 6.36 | 1000 | 60 | 17.5 | 4.4 | 1.1 | 99.2. | 1 | n.a. | n.a. | 2.7 |
| 4* | A-4 | 2.2 | 9.42 | 1930 | 60 | 161 | 73.2 | 0.2 | n.a. | n.a. | 97 | 45 | n.a. |

*comparative
n.a. = not available

TABLE 2

| Ex | met. | mg | mmol Al | Tpol °C. | t (min) | yield (g) | Activity kg/($g_{cat}$ * h) | I.V. | $T_m$(II) °C. | $\Delta H_f$ J/g | Mw/Mn |
|---|---|---|---|---|---|---|---|---|---|---|---|
| 5 | A-1 | 3.9 | 8.28 | 50 | 120 | 150 | 19.2 | 2.23 | 104 | 27.8 | 2.19 |
| 6 | A-1 | 2 | 4.20 | 75 | 60 | 45 | 22.5 | 1.13 | 93 | 28.9 | 2.23 |
| 7 | A-1 | 2 | 4.20 | 85 | 60 | 187 | 93.5 | 1.28 | 97 | 28.3 | 2.27 |
| 8 | A-5 | 2 | 4.08 | 50 | 60 | 185 | 92.5 | 2.15 | 90 | 19.6 | 2.15 |
| 9 | A-5 | 2 | 4.08 | 70 | 60 | 320 | 160 | 1.04 | 85 | 15.1 | 2.34 |

TABLE 2a

| Ex | Flexural modulus (MPa) | Yield strength (MPa) | Break strength (MPa) | Elongat. at break (%) |
|---|---|---|---|---|
| 8 | 160 | 10.2. | 30.6 | 420 |
| 9 | 187 | 9.1 | 24.1 | 480 |

TABLE 3

| Ex | met. | mg | mmol Al | Tpol °C. | t(min) | $C_2$ added g | $C_2$ feed G | yield (g) | Activity kg/($g_{cat}$ * h) | I.V. | $C_2$ wt % (IR) | Mw/Mn |
|---|---|---|---|---|---|---|---|---|---|---|---|---|
| 10 | A-1 | 1 | 2.12 | 70 | 60 | 32 | 0 | 52.7 | 52.7 | 1.13 | 28.90 | 2.17 |
| 11 | A-1 | 2 | 2.12 | 70 | 70 | 1 | 5.1 | 225 | 96.4 | 1.46 | 2.30 | 2.23 |
| 12 | A-1 | 2 | 2.12 | 70 | 70 | 4 | 11.6 | 157 | 67.3 | 1.45 | 4.20 | 2.16 |
| 13 | A-1 | 2 | 2.12 | 70 | 70 | 10 | 19.6 | 224 | 96.0 | 1.18 | 7.30 | 2.14 |

$C_2$ added = ethylene added in the reactor with 1-butene
$C_2$ feed = ethylene feed during the polymerization

The invention claimed is:

1. A process for polymerizing 1-butene carrier out in liquid monomer, wherein the liquid monomer comprises liquid 1-butene, the process comprising the step of contacting, under polymerization conditions, 1-butene and optionally from 0 to 20% by mol of ethylene, propylene and/or an alpha olefins of formula $CH_2=CHZ$ wherein Z is a $C_3$-$C_{10}$ alkyl group, with a catalyst system obtained by contacting:

a) a racemic or racemic-like bridged metallocene compound of formula (I)

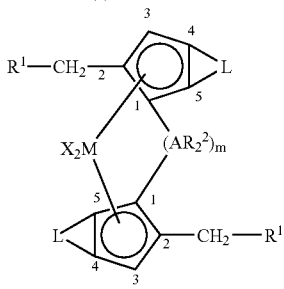

wherein $R^1$, same or different, is hydrogen, a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optionally containing heteroatoms belonging to groups 13-17 of the Periodic Table of the Elements;

A, same or different, is a carbon atom, a germanium atom or a silicon atom; with the proviso that when m is 1, A is not a carbon atom;

m is 1 or 2;

$R^2$, same or different, is hydrogen, a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optionally containing heteroatoms belonging to groups 13-17 of the Periodic Table of the Elements;

M is a transition metal atom selected from those belonging to group 4 of the Periodic Table of the Elements;

X, same or different, is a hydrogen atom, a halogen atom, or a R, OR, $OSO_2CF_3$, OCOR, SR, $NR_2$ or $PR_2$ group, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of L, same or different, is a moiety of formula (IIa)

(IIa)

wherein
in the moiety of formula (IIa), T bonds to the cyclopentadienyl group in position 5;
T is an oxygen (O) atom, a sulphur (S) atom, or a $CH_2$ group;
$R^3$ is hydrogen, linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing heteroatoms belonging to groups 13-17 of the Periodic Table of the Elements;
b) an alumoxane or a compound of formula $D^+E^-$, wherein $D^+$ is a Brønsted acid that donates a proton and to react irreversibly with a substituent X of the metallocene of formula (I) and $E^-$ is a compatible anion which stabilizes the active catalytic species originating from the reaction of the two compounds, and which is sufficiently labile to be removed by an olefinic monomer; and c) optionally an organo aluminum compound, wherein the process produces a polymer comprising more isotactic triads (mm) than syndiotactic triads (rr) and having an intrinsic viscosity higher than 1.0 dL/g.

2. The process according to claim 1 wherein in the bridged metallocene compound of formula (I),
$R^1$ is selected from the group consisting of hydrogen and $C_1$-$C_{20}$-alkyl radical; $R^2$ is selected from hydrogen, $C_1$-$C_{20}$-alkyl or $C_6$-$C_{20}$-aryl; m is 1; A is a silicon atom; M M is zirconium or hafnium; X is a hydrogen atom, a halogen atom or R group.

3. The process according to claim 2 wherein the bridge $(R^2_2A)_m$ is selected from $Si(CH_3)_2$, or $SiPh_2$.

4. The process according to claim 1 wherein in the moiety of formula (IIa), $R^3$ is hydrogen or methyl.

5. The process according to claim 1 wherein the bridged metallocene compound has formula (IV):

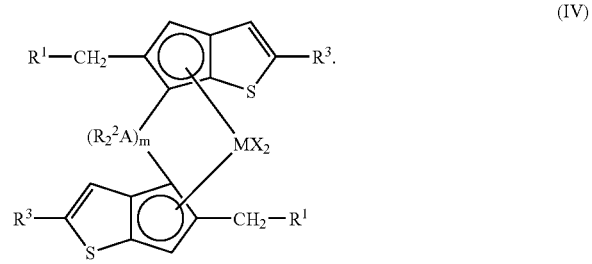
(IV)

* * * * *